United States Patent
Morenko

(10) Patent No.: US 11,572,922 B2
(45) Date of Patent: Feb. 7, 2023

(54) BEARING HOUSING AND METHOD OF MAKING

(71) Applicant: PRATT & WHITNEY CANADA CORP., Longueuil (CA)

(72) Inventor: Oleg Morenko, Oakville (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 17/123,278

(22) Filed: Dec. 16, 2020

(65) Prior Publication Data

US 2022/0186784 A1   Jun. 16, 2022

(51) Int. Cl.
| | | |
|---|---|---|
| F16C 35/04 | (2006.01) | |
| F01D 5/02 | (2006.01) | |
| F01D 25/16 | (2006.01) | |
| F16C 33/66 | (2006.01) | |

(52) U.S. Cl.
CPC .............. *F16C 35/042* (2013.01); *F01D 5/02* (2013.01); *F01D 25/16* (2013.01); *F16C 33/6659* (2013.01); *F05D 2220/32* (2013.01); *F05D 2240/50* (2013.01); *F16C 2360/23* (2013.01)

(58) Field of Classification Search
CPC ........ F01D 25/16; F01D 25/162; F01D 25/18; F16C 35/042; F16C 37/007; F16C 2360/23; F05D 2220/32; F05D 2240/50; F02C 7/06
See application file for complete search history.

(56) References Cited

U.S. PATENT DOCUMENTS

| | | | |
|---|---|---|---|
| 2,956,824 A | 10/1960 | Kuchler et al. | |
| 4,971,184 A * | 11/1990 | Lederman | ............... F16D 13/74 192/45.006 |
| 5,301,957 A | 4/1994 | Hwang | |
| 2005/0244272 A1* | 11/2005 | Bruno | ..................... F01D 5/027 416/144 |
| 2013/0287553 A1* | 10/2013 | Coffin | ....................... F02K 3/06 415/175 |
| 2016/0348522 A1 | 12/2016 | Labbe | |
| 2016/0369884 A1* | 12/2016 | Otto | .......................... F02K 3/06 |
| 2020/0172228 A1* | 6/2020 | Servant | ................. B64C 11/303 |

OTHER PUBLICATIONS

European Search Report issued in counterpart application 21215136.9 dated Jun. 30, 2022.

* cited by examiner

*Primary Examiner* — Eldon T Brockman
*Assistant Examiner* — Elton K Wong
(74) *Attorney, Agent, or Firm* — Norton Rose Fulbright Canada LLP

(57) ABSTRACT

A bearing housing for supporting a bearing of a gas turbine engine. The bearing housing comprises an annular body extending around an axis and having an oil inlet and an oil outlet. The bearing housing further comprises an oil manifold integrated into the annular body, the oil manifold having an inner oil channel defined in the annular body and extending circumferentially around the axis, the inner oil channel in fluid communication with the oil inlet and at least one oil jet directed towards the bearing.

20 Claims, 6 Drawing Sheets

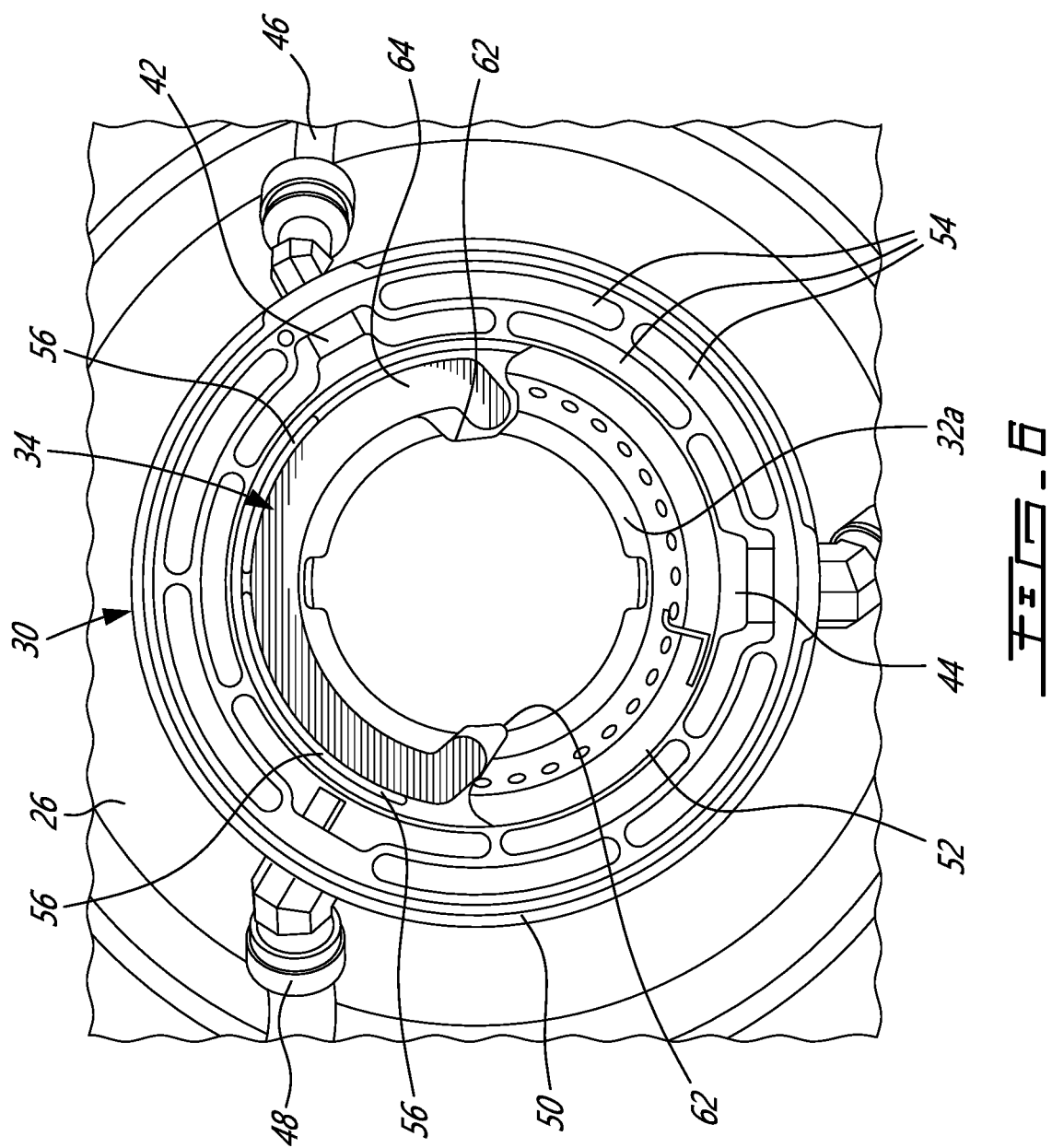

BEARING HOUSING AND METHOD OF MAKING

TECHNICAL FIELD

The disclosure relates generally to gas turbine engines and, more particularly, to bearing housings for gas turbine engines.

BACKGROUND

Oil is delivered to various locations in gas turbine engines for cooling and lubricating purposes. In typical gas turbine engines, a bearing housing may include an oil manifold that is bolted, braced or otherwise mounted within the bearing housing. This oil manifold delivers oil to the bearing housed within the bearing housing and to the main engine shaft via one or more oil jets. Such typical add-on oil manifolds are often complicated to install and/or repair, offer little flexibility in terms of optimizing the placement of the oil jets, and could potentially interfere with rotating components such as the engine shaft. In addition, such add-on manifolds typically require their own complex sealing arrangements to connect to the engine's main oil supply to avoid temperature-related degradation.

SUMMARY

In one aspect, there is provided a bearing housing for supporting a bearing of a gas turbine engine, the bearing housing comprising: an annular body extending around an axis and having an oil inlet and an oil outlet; and an oil manifold integrated into the annular body, the oil manifold having an inner oil channel defined in the annular body and extending circumferentially around the axis, the inner oil channel in fluid communication with the oil inlet and at least one oil jet directed towards the bearing.

In another aspect, there is provided a gas turbine engine comprising: a rotor mounted for rotation about an axis; and a bearing housing including an interior chamber with a bearing rotationally supporting the rotor, the bearing housing having an annular body and an oil manifold integrated into the annular body, the oil manifold having an inner oil channel defined into the annular body, the inner oil channel extending in a circumferential direction about the axis, the inner oil channel in fluid communication with an oil inlet and at least one oil jet directed towards the bearing.

In another aspect, there is provided a method of manufacturing a bearing housing for a gas turbine engine, comprising forming the bearing housing with an integrated oil manifold from a single piece of material.

In an embodiment, the forming the bearing housing with the integrated oil manifold includes forming a circumferentially disposed inner oil channel within the oil manifold and at least one oil jet in fluid communication with the inner oil channel.

BRIEF DESCRIPTION OF THE DRAWINGS

Reference is now made to the accompanying figures in which:

FIG. 6 is a front view of the bearing housing of FIG. 4 with certain features omitted.

DETAILED DESCRIPTION

Figure 1:
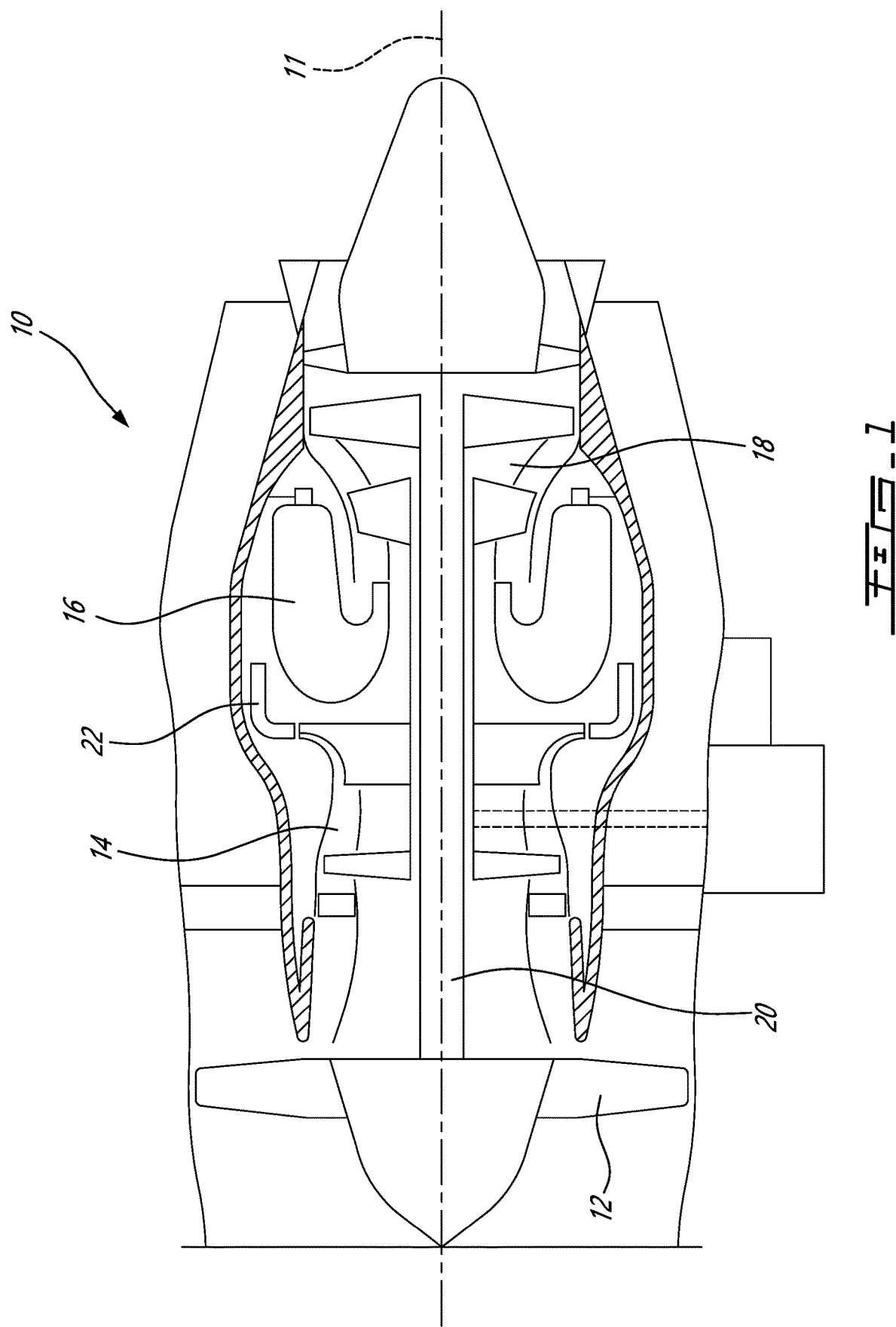
FIG. 1 is a schematic cross sectional view of a gas turbine engine.

FIG. 1 illustrates a gas turbine engine 10 of a type preferably provided for use in subsonic flight, generally comprising in serial flow communication a fan 12 through which ambient air is propelled, a compressor 14 for pressurizing the air, a combustor 16 in which the compressed air is mixed with fuel and ignited for generating an annular stream of hot combustion gases, and a turbine section 18 for extracting energy from the combustion gases. A shaft 20 interconnects the fan 12, the compressor 14 and the turbine 18. In use, pressurized air provided by the compressor 14 through a diffuser 22 enters the combustor 16 for combustion. While FIG. 1 shows gas turbine engine 10 to be a turbofan gas turbine engine, it is understood that the present disclosure is applicable to other types of gas turbine engines as well.

Figure 2:
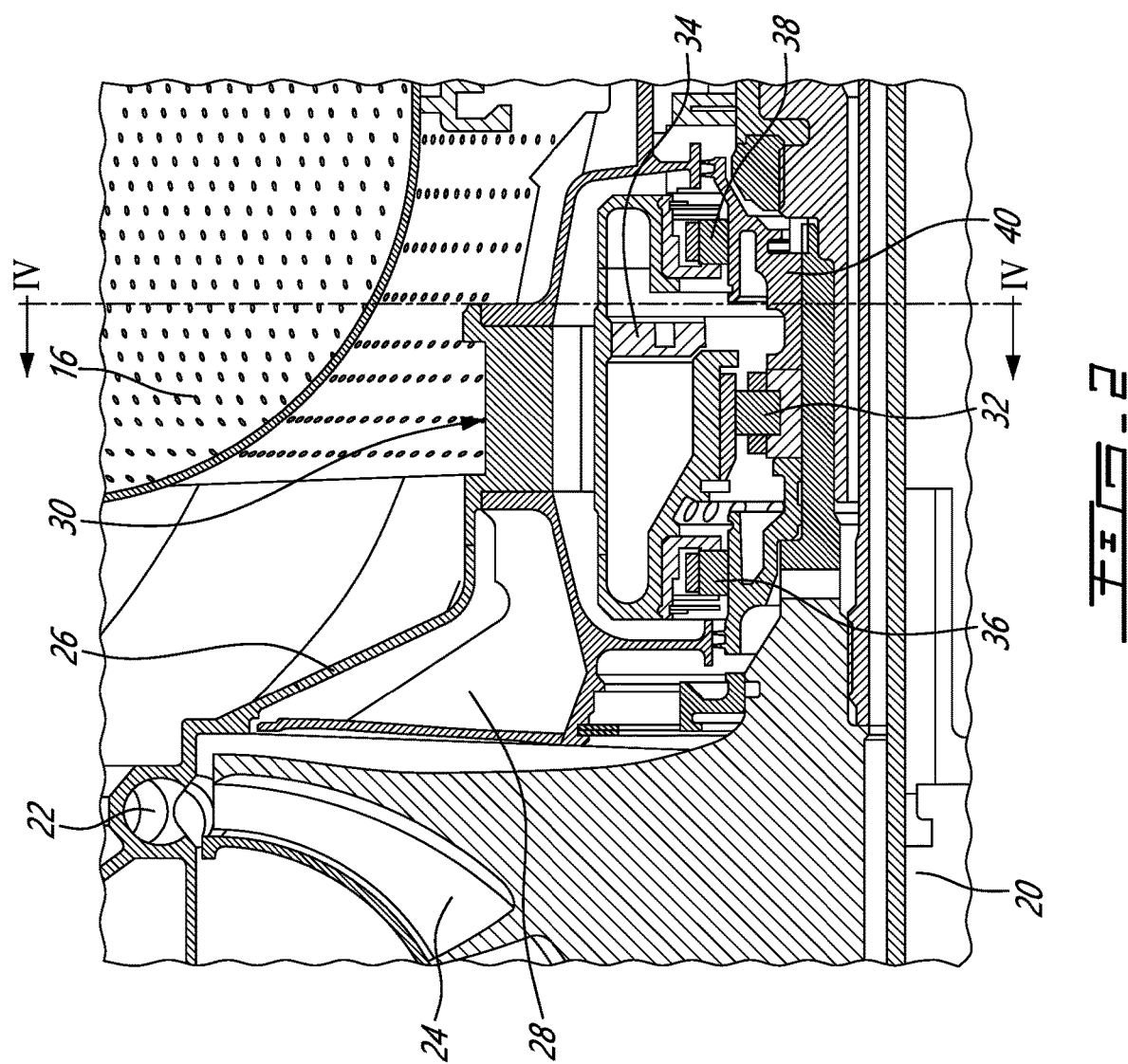
FIG. 2 is an enhanced cross sectional view of a bearing housing within the gas turbine engine with an integrated oil manifold, according to an embodiment of the present disclosure.
Figure 3:
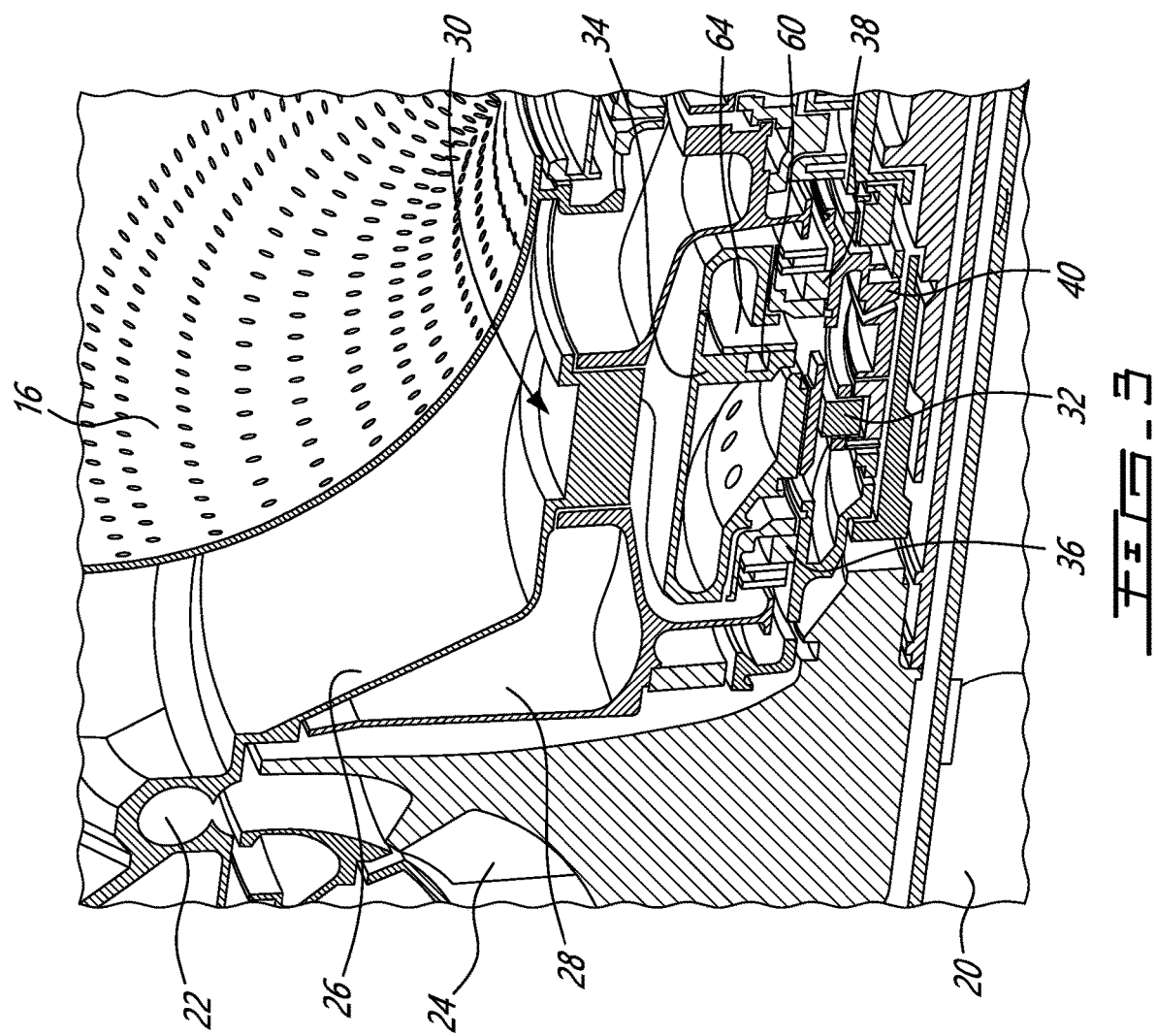
FIG. 3 is a perspective cross sectional view of the bearing housing of FIG. 2.

FIGS. 2 and 3 show an enhanced view of the engine 10 proximate the combustor 16 and diffuser 22. A compressor 14 as in FIG. 1, which may include multiple axial stage rotors, is followed by a centrifugal impeller 24 having a coverplate 26. The compressor 14 supplies pressurized air to the combustor 16, the hot gases from which drive a turbine 18 as in FIG. 1. A baffle 28 mounted downstream of the impeller 24 may reduce the velocity of the swirling air leaving the impeller 24.

As further shown in FIGS. 2 and 3, a bearing housing 30 houses a bearing 32 which rotationally supports rotors such as the compressor 14 and turbine 18 on the shaft 20. In the shown case the bearing 32 is a roller bearing, although other bearings such as a ball bearing may be contemplated as well. The baffle 28 may be mounted to the bearing housing 30 as shown, although other arrangements may be contemplated as well. The bearing 32, housed within an interior chamber of the bearing housing 30, and the shaft 20 are lubricated and/or cooled with oil distributed by an oil manifold 34 integrated into the bearing housing 30. By "integrated", it is understood that the bearing housing 30 and the oil manifold 34 are machined or otherwise formed as a single, unitary or monolithic piece. Various machining processes may be contemplated, as will be discussed in further detail below.

A front carbon seal 36 as well as a rear carbon seal 38 may be mounted within the bearing housing 30 to ensure that oil is sealed within the bearing housing 30. The front carbon seal 36, which may be a controlled-gap seal, may be pressurized, for instance via air from the impeller 24, to prevent oil distributed by the oil manifold 34 from leaking out of the bearing housing 30. Other seals may be contemplated as well. As will be discussed in further detail below, oil may be distributed by the oil manifold via an oil scoop 40 to lubricate and/or cool the shaft 20 and the bearing 32. In the shown case, the oil scoop 40 is disposed about the shaft 20 downstream of the bearing 32 and is radially aligned with the oil manifold 34.

Figure 4:
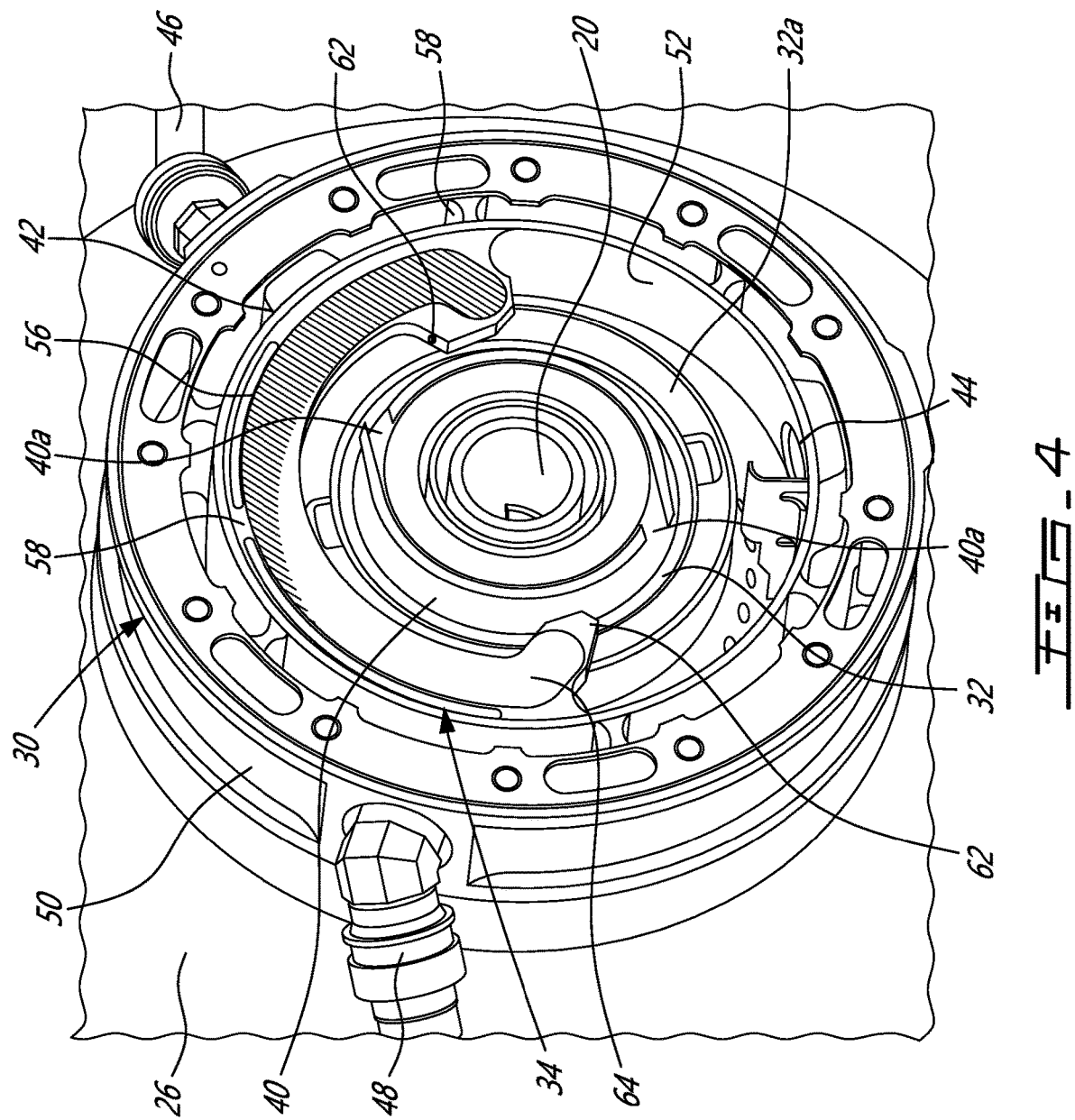
FIG. 4 is a perspective cross sectional view of the bearing housing of FIG. 2 taken along the line IV-IV.
Figure 5:
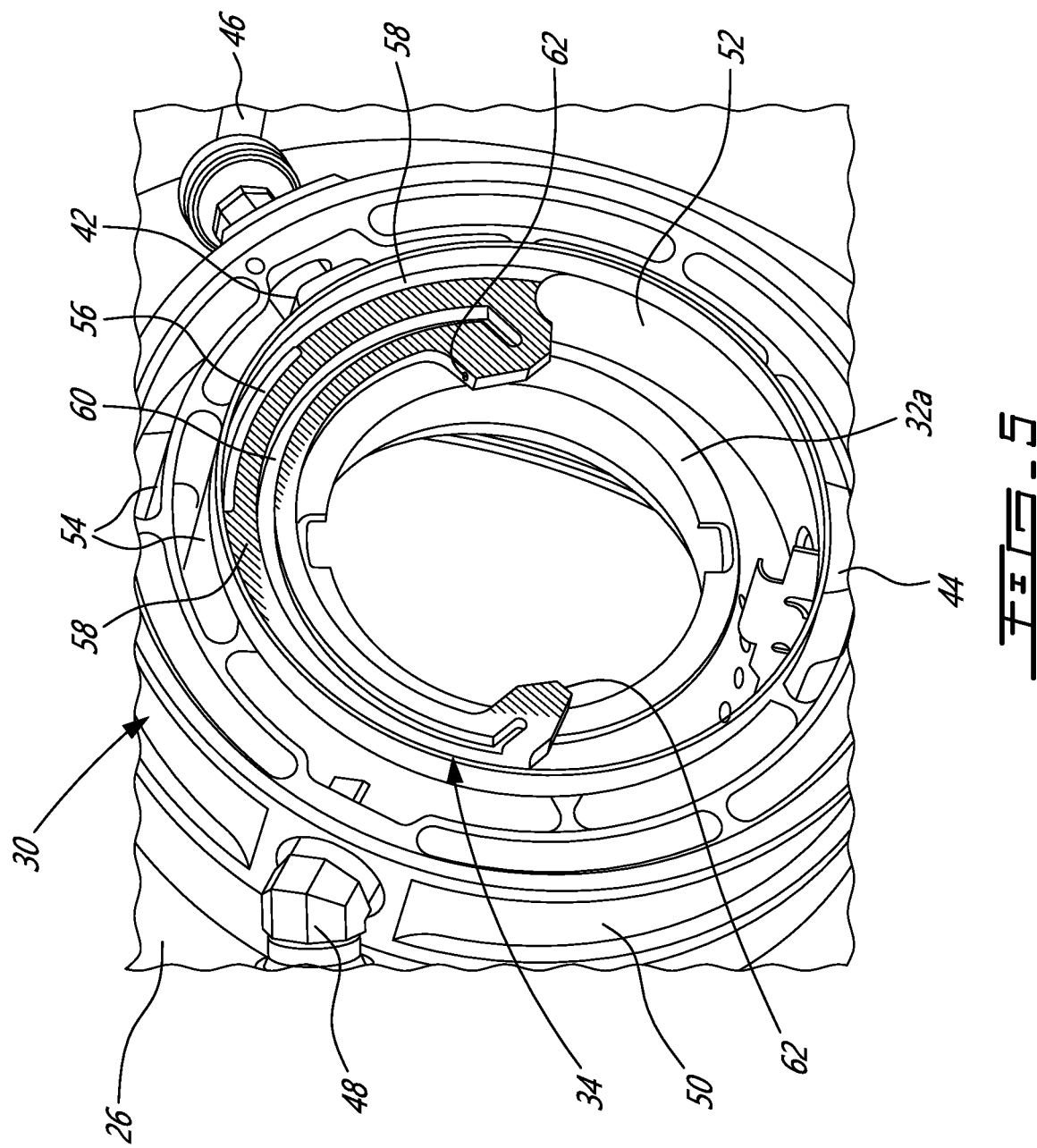
FIG. 5 is a perspective cross sectional view of the bearing housing of FIG. 4 with certain features omitted.

Referring additionally to FIGS. 4 to 6, the bearing housing 30 includes an oil inlet 42 and an oil outlet 44. Oil may be delivered to the oil inlet 42 via an oil supply tube 46 or other like fluid delivery system. The oil may be provided from the engine's primary oil source, although other oil sources within the engine may be contemplated as well. Oil may be drained from the bearing housing 30, for instance after lubricating and/or cooling the bearing 32 and shaft 20, via the oil outlet 44. The drained oil may then be circulated back to the main oil supply or delivered to another location in the engine 10. In the shown case, an air inlet 48 supplies air to the bearing housing 30, for instance for various cooling or sealing purposes.

The positioning of the oil inlet 42, oil outlet 44 and air inlet 48 about the bearing housing 30 may vary. In the shown case, the oil outlet 44 is positioned at the circumferential bottom of the bearing housing 30, while the oil inlet 42 and air inlet 48 are each positioned approximately sixty degrees apart from the oil outlet 44. Other positions may be contemplated as well. For instance, the oil inlet 42 may be positioned closer to one of the oil outlet 44 or air inlet 48. As will be discussed in further detail below, the delivery of oil via the oil manifold 34 may be optimized regardless of the positioning of the oil inlet 42 within the bearing housing.

The bearing housing 30 has an annular body extending around the axis 11 with an outer wall 50 and an inner wall 52. The bearing housing 30 further includes a bearing seat 32a with which the outer race of the bearing 32 is engaged. As can be seen in FIGS. 5 and 6, a plurality of webbed cutouts or windows 54 may be present in the annular body of the bearing housing 30, for instance to introduce required bearing support flexibility or to reduce weight. In addition, the presence of such webbed cutouts or windows 54 may allow additional airflow through the body of the bearing housing 30 for various engine needs. The integrated oil manifold 34 protrudes from the inner wall 52 and generally follows the circular shape of the inner wall 52. In the shown case, a plurality of gaps or cutouts 56 are formed between connecting ribs 58. These integrated ribs 58 are formed between the oil manifold 34 and the inner wall 52. These gaps or cutouts 56 may contribute to a lower overall engine weight. In other cases, the oil manifold 34 may be completely flush with the inner wall 52.

The integrated oil manifold 34 includes an inner oil channel 60 which receives oil via the oil inlet 42. The inner oil channel 60 is defined in the annular body of the bearing housing 30 and extends in the circumferential direction along an arc of circle around the axis 11. The inner oil channel 60 directs the oil to one or more oil jets 62 which direct the oil to the bearing 32, the shaft 20, and/or other internal components for lubrication and/or cooling purposes. In the shown case, the oil manifold 34 includes two oil jets 62 disposed at opposed circumferential ends of the oil channel 60. In the shown case, the interior oil channel 60 extends radially inward towards each of the two oil jets 62 respectively at opposed ends of the interior oil channel 60. As such, oil from the oil inlet 42 is diverted in two opposed circumferential directions once it reaches the inner oil channel 60 towards each oil jet 62. Other numbers of oil jets 62 may be contemplated as well based on the lubrication or cooling needs of a given engine. For instance, in a smaller engine, a single oil jet 62 may suffice, whereas a larger engine may require four oil jets 62. In the shown case, the oil jets 62 direct oil to inlets 40a in the oil scoop 40 for distribution to the bearing 32 and shaft 20, although other distribution techniques may be contemplated as well.

The circumferential spacing between the oil jets 62 may vary, for instance based on the number of oil jets 62 and the number and locations of the oil scoop inlets 40a. In the shown case, the two oil jets 62 are positioned approximately one hundred and eighty degrees apart. Such positioning may provide optimal lubrication and cooling to the shaft 20 and bearing 32. Other angles between the oil jets 62 may be contemplated as well, offering flexibility in optimizing the direction(s) from which the bearing 32 and shaft 20 receive oil. For instance, in an oil manifold 34 with three oil jets 62, the oil jets 62 may be positioned around sixty degrees apart. As the oil manifold 34 follows the curvature of the inner wall 52, the spacing between the oil jets 62 can vary without concern of the oil manifold 34 interfering with components such as the oil scoop 40, bearing 32 or shaft 20.

The directions of the oil jets 62 may vary as well. In the shown case, as can be seen in FIG. 4, the oil jets are each directed tangentially towards the bearing 32, shaft 20 and oil scoop 40. In addition, the oil jets 62 are positioned to inject oil directly into the oil scoop inlets 40a. When the engine 10 is in use, the oil scoop 40 may remain stationary while the shaft 20 and bearing 32 rotate in a same direction, for instance counter-clockwise when viewed from an upstream engine direction, as the direction of the incoming oil stream. Other directions may be contemplated as well, for instance based on the positioning and number of oil jets 62.

In the shown case, a cover 64 is mounted to the oil manifold 34 to seal the inner oil channel 60. The cover 64 can be welded, braced, or otherwise mounted to the oil manifold 34. The cover 64 generally follows the curved shape of the oil manifold 34. In other cases, the inner oil channel 60 may be formed within the oil manifold 34 between the oil jet(s) 62 and oil inlet 42 and thus not require a cover 64.

The circumferential span of the oil manifold 34 may vary, for instance based on the number of oil jets 62 or the desired angle between adjacent oil jets 62. In the shown case, the oil manifold 34 spans around one hundred and eighty degrees, or around half of the inner circumference of the bearing housing 30. Other spans may be contemplated as well, for instance an oil manifold 34 spanning the entire circumference of the oil manifold 34 with numerous oil jets 62 spaced along. In such cases with more than two oil jets 62, adjacent oil jets 62 may or may not be evenly spaced apart along the oil manifold 34. In addition, the oil inlet 42 can be positioned at various locations along the span of the oil manifold 34. In the shown case, the oil inlet 42 is circumferentially closer to one of the two oil jets 62, although this position may vary. As the position of the oil inlet 42 is variable, it may be a function of other engine design considerations. In the shown case, the oil inlet 42 meets the inner oil channel 60 partway between the two oil jets 62. Other oil entry points to the inner oil channel 60 may be contemplated as well. For instance, in some cases the oil inlet 42 may deliver oil to an end of the oil manifold 34, i.e. at one of the ends of the inner oil channel 60. In addition, while in the shown case the oil jets 62 are positioned at the ends of the inner oil channel 60, in other cases one or more oil jets 62 may be positioned along the length of the inner oil channel 60.

The radial width of the oil manifold 34, i.e. the distance that the integrated oil manifold 34 protrudes from the inner wall 52 of the bearing housing 30, may vary. For instance, a wider oil manifold 34 may be needed in cases of higher oil flows. Alternatively, the radial width of the oil manifold 34 should not exceed a value beyond which the oil manifold 34 may interfere with other components within the bearing housing 30 such as the oil scoop 40, the bearing 32 or the shaft 20. The width and axial depth of the inner oil channel 60 may vary as well, for instance based on the required oil flow and the overall size of the oil manifold 34. In various cases, the inner oil channel 60 can have a variable axial or cross-sectional depth to optimize oil flow. For instance, the inner oil channel 60 may include an axial depth that increases from the oil inlet 42 towards the oil jet(s) 62 to promote the flow of oil towards the oil jet(s) 62, regardless of the circumferential positioning of the oil inlet 42.

As discussed above, the bearing housing 30 with the integrated oil manifold 34 is manufactured or otherwise formed from a single piece of material, improving the durability relative to traditional add-on oil manifolds. Various manufacturing techniques may be contemplated, such as machining from a solid material, casting, or other suitable techniques. Compared to traditional standalone or non-integrated oil manifolds, there are fewer required manufacturing and assembly steps, as the oil manifold 34 does not need to be welded or brazed to the bearing housing 30. As discussed above, in some cases, one or more gaps or cutouts 56 may be formed between sections of the oil manifold 34 and the inner wall 52. In such cases, such cutouts 56 may be drilled or otherwise extruded from the single-formed piece of material comprising the bearing housing 30 with the integrated oil manifold 34, forming integrated ribs 58 between the oil manifold 34 and the inner wall 52. Fewer pieces of manifold attachment hardware may be required as well. In addition, the part tolerances and positional relationships between the oil manifold 34 and the bearing housing 30 may be improved relative to non-integrated oil manifolds as the two parts are integrated. As there are fewer welding and/or brazing joints that could potentially fail, the risk of loose hardware may be lowered with the integrated oil manifold 34 design. Fewer vibrations may occur due to the integrated design as well.

The bearing housing 30 with the integrated oil manifold 34 may offer greater flexibility to optimize oil delivery relative to traditional non-integrated add-on oil manifolds. For instance, as the oil jets 62 may be positioned at any circumferential position within the bearing housing 30, oil may be delivered to the shaft 20 and bearing 32 at optimal locations and from optimal angles, increasing performance. In addition, as the integrated oil manifold 34 follows the circumference of the inner wall 52 of the bearing housing 30, the positioning of the oil jets 62 (and its effect on the overall size of the oil manifold 34) will not pose interference risks with the shaft 20, bearing 32 or oil scoop 40. Further, the number of oil jets 62 can be increased without having to dramatically alter the shape or number of components of the oil manifold 34.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A bearing housing for supporting a bearing of a gas turbine engine, the bearing housing comprising:
   an annular body extending around an axis and having an oil inlet and an oil outlet, the annular body defining a radially outer wall of the bearing housing and a radially inner wall of the bearing housing; and
   an oil manifold integrated monolithically into the annular body and protruding from the radially inner wall of the bearing housing, the oil manifold having an inner oil channel defined in the annular body and extending circumferentially around the axis, the inner oil channel in fluid communication with the oil inlet and at least one oil jet directed towards the bearing.

2. The bearing housing as defined in claim 1, wherein the inner oil channel extends along an arc of circle, and wherein the at least one oil jet includes two oil jets respectively disposed at opposed ends of the inner oil channel.

3. The bearing housing as defined in claim 2, wherein the two oil jets are circumferentially disposed one hundred and eighty degrees apart.

4. The bearing housing as defined in claim 2, wherein the interior oil channel extends radially inward towards each of the two oil jets respectively at the opposed ends of the inner oil channel.

5. The bearing housing as defined in claim 1, wherein the at least one oil jet includes two circumferentially spaced-apart oil jets formed in the annular body and directed tangentially towards the bearing.

6. The bearing housing as defined in claim 1, wherein the inner oil channel includes an axial depth that increases towards the at least one oil jet.

7. The bearing housing as defined in claim 1, further comprising a cover mountable to the oil manifold for sealing the inner oil channel.

8. The bearing housing as defined in claim 1, further comprising a plurality of integrated ribs formed between the oil manifold and the inner wall of the bearing housing.

9. The bearing housing as defined in claim 1, further comprising an oil scoop radially aligned with the oil manifold within the bearing housing and disposed downstream of the bearing, the oil scoop directing oil supplied from the at least one jet to the bearing.

10. The bearing housing as defined in claim 9, wherein each at least one oil jet is directed towards one or more inlets of the oil scoop.

11. A gas turbine engine comprising:
    a rotor mounted for rotation about an axis; and
    a bearing housing including an interior chamber with a bearing rotationally supporting the rotor, the bearing housing having an annular body defining a radially outer wall of the bearing housing, a radially inner wall of the bearing housing and an oil manifold integrated monolithically into the annular body and protruding from the radially inner wall of the bearing housing, the oil manifold having an inner oil channel defined into the annular body, the inner oil channel extending in a circumferential direction about the axis, the inner oil channel in fluid communication with an oil inlet and at least one oil jet directed towards the bearing.

12. The gas turbine engine as defined in claim 11, wherein the inner oil channel extends along an arc of circle, and wherein the at least one oil jet includes two oil jets respectively disposed at opposite ends of the inner oil channel.

13. The gas turbine engine as defined in claim 12, wherein the two oil jets are circumferentially disposed one hundred and eighty degrees apart.

14. The gas turbine engine as defined in claim 12, wherein the interior oil channel extends radially inward towards each of the two oil jets respectively at the opposed ends of the inner oil channel.

15. The gas turbine engine as defined in claim 11, wherein the at least one oil jet includes two circumferentially spaced-apart oil jets formed in the annular body and directed tangentially towards the bearing.

16. The gas turbine engine as defined in claim 11, wherein the inner oil channel includes an axial depth that increases towards the at least one oil jet.

17. The gas turbine engine as defined in claim 11, further comprising a cover mountable to the oil manifold for sealing the inner oil channel.

18. The gas turbine engine as defined in claim 11, further comprising a plurality of integrated ribs formed between the oil manifold and the inner wall of the bearing housing.

19. The gas turbine engine as defined in claim 11, further comprising an oil scoop disposed downstream of the bearing and radially aligned with the oil manifold within the bearing housing, the oil scoop directing oil supplied from the at least one jet to the bearing.

20. The gas turbine engine as defined in claim 19, wherein each at least one oil jet is directed towards one or more inlets of the oil scoop.

* * * * *